Nov. 7, 1961     S. TEPPER     3,007,612
VARIABLE MEASURING AND DISPENSING DEVICE
Filed Nov. 12, 1958
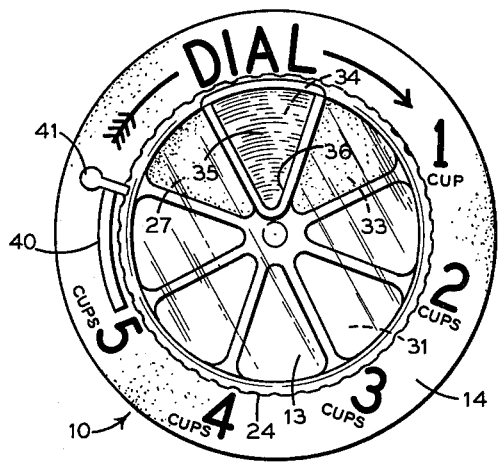
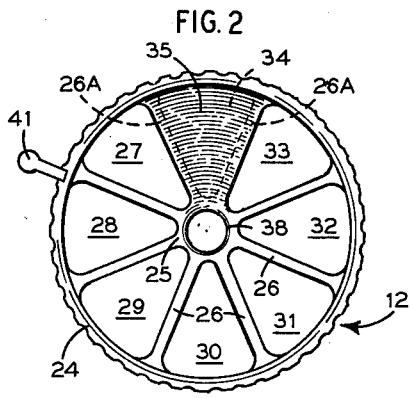
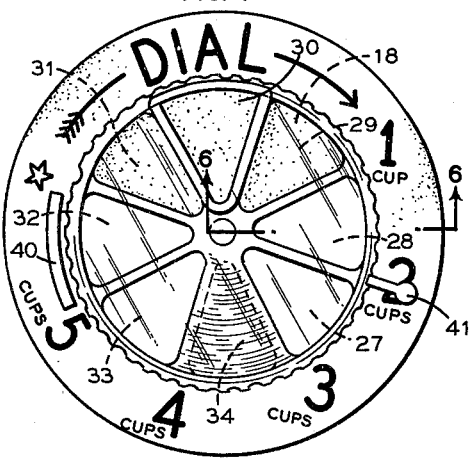
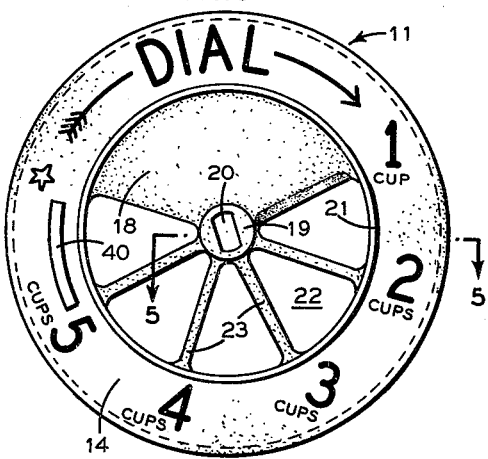
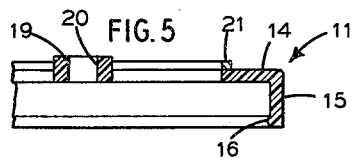
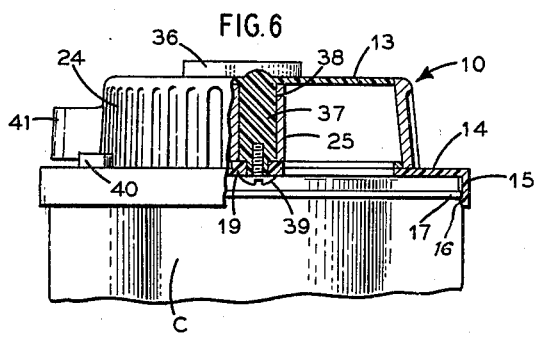
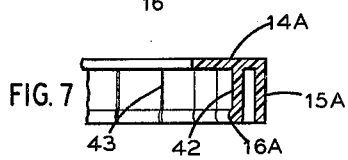
INVENTOR.
Solomon Tepper
BY
ATTORNEY

United States Patent Office 3,007,612
Patented Nov. 7, 1961

3,007,612
VARIABLE MEASURING AND DISPENSING DEVICE
Solomon Tepper, 11 Stonewell Road,
Rockville Centre, N.Y.
Filed Nov. 12, 1958, Ser. No. 773,406
6 Claims. (Cl. 222—284)

This invention relates to a device for measuring and dispensing the contents of a container in varied, selected amounts.

It is frequently desirable to dispense the contents of a container in selected, varied amounts, such as ground or powdered coffee, sugar, flour or the like, where the container is of the open mouth canister type.

Accordingly, an object of this invention is to provide an improved device attachable to the mouth of such container and which may be manipulated in a manner to permit the contents of the container to be accurately measured in selected amounts and quickly dispensed.

Another object of this invention is to provide a device of the character described, which includes a member movable from a rest position to selected positions corresponding to varied measured amounts; the member than being movable back to its rest position whereby the selected amount is dispensed.

A further object of this invention is to provide a device of the character described which comprises a minimum number of component parts which are easily fabricated and assembled; which is readily manipulated to measure and dispense varied amounts of the contents of a container with which the device is associated; and which may encompass any number of multiples of a given minimum amount.

Other objects of this invention will in part be obvious and in part hereinafter pointed out.

In the drawing,

FIG. 1 is a top plan view of a measuring and dispensing device embodying the invention;

FIG. 2 is a top plan view of a tubular member forming a portion of the device;

FIG. 3 is a top plan view of a base member forming a portion of the device;

FIG. 4 is a top plan view similar to that shown in FIG. 1, with the tubular member rotated to a predetermined filling position;

FIG. 5 is a transverse sectional view taken on the line 5—5 of FIG. 3;

FIG. 6 is a transverse sectional view taken on the line 6—6 of FIG. 4; and

FIG. 7 is a partial transverse sectional view of the base member showing an alternative form of attaching flange.

It is desirable to measure and dispense variable amounts of the contents of cans, canisters and the like; such as ground or powdered coffee; sugar, flour or other materials contained within such cans or canisters. The device of the instant invention, generally indicated at 10, is adapted to be mounted on the mouth of a container C, after the cover thereof has been removed. Device 10 may be left on container C and thus also provide cover means for the same.

Device 10 essentially comprises a base member 11 of circular shape, a tubular compartmented member 12 rotatably mounted on member 11, and a circular disc 13 fixed on member 11 in spaced relation thereto and closing the outer end portion of member 12.

Base member 11, which may be molded of synthetic plastic, comprises a marginal wall portion 14 from which depends an attaching flange 15 having an annular bead 16 on the inner surface thereof whereby device 10 may be detachably mounted on the mouth of container C, as indicated in FIG. 6. Bead 16 thus engages the usual annular shoulder 17 found on containers C.

The member 11 further includes a base wall portion 18 of sector shape having a central portion 19 which may be slightly raised and is formed with a substantially rectangular slot 20, for the purpose hereinafter appearing. An annular ring 21 extends about wall portion 18 and defines with said wall portion a sector shaped opening 22, which may be subdivided by radial strut portions 23 extending from central portion 19 to ring 21. If desired, struts 23 may be omitted to provide a single large opening 22.

Tubular member 12 may be formed of metal or plastic and may be slightly conical in shape. Member 12 comprises a substantially cylindrical side wall 24, a hub portion 25 and a plurality of radially extending partion walls 26 interconnecting hub portion 25 and side wall 24. For the purpose of illustration member 12 is shown as having eight similar compartments 27—34, however, compartment 34 is closed at its outer end by a sector shaped wall 35 extending between partition walls 26a which define compartment 34.

Disc 13, which may be formed of plastic, has a sector shaped discharge opening 36 and a depending, integral post 37 located axially thereof. Post 37 passes through an axial opening 38 in hub portion 25 of member 12. The lower end of post 37 is reduced in size and of a shape to fit into slot 20 in base portion 19. A single screw 39 threaded into a tapped opening in post 37, with its head spanning opening 20, holds members 11, 12 and disc 13 in assembled relation.

A stop member 40 is fixed to wall portion 14 of base member 11 and a radially extending abutment member 41 on wall 24 of tubular member 12 is adapted to engage stop member 40, to locate tubular member 12 relative to base member 11 in a normal rest position, as indicated in FIG. 1. In this case, the lower end of the successive compartments 27, 34 and 33 will be closed off by wall portion 18 of base member 11, leaving the remaining compartments 28, 29, 30, 31 and 32 open at their lower ends for communication with the interior of can C.

The member 12 is adapted to be rotated, as by means 41, to selected angular positions whereby one or more of the compartments in said member, not exceeding five in number, may be filled with the contents of container C; the member 12 then being moved in a direction to discharge the contents of said compartments through discharge opening 36 in disc 13. Conveniently, the wall portion 14 may be marked to indicate successive angular positions, which in the case of coffee, as the contents of container C, may be denominated in terms of 1 to 5 cups.

In using device 10 as the same is attached to container C, the container is in its normally upright position as shown in FIG. 6. Assuming, that it is desired to measure out and dispense coffee for 2 cups, corresponding to the contents of 2 compartments in member 12. In this case, member 12 is rotated by member 41 to the position shown in FIG. 4, wherein member 41 is at the 2 cup marking.

This will bring compartments 29, 30, 31 to a position closing the lower ends thereof by wall portion 18 and leaving the remaining compartments 28, 27, 34, 33 and 32 open at their lower ends and in communication with the interior of container C. At this time, container C is inverted, thereby filling the indicated compartments with the contents of said container.

While container C is still in its inverted position, member 12 is rotated in the opposite direction until abutment member 41 engages stop 40. During such rotary movement, compartments 28, 27 will successively register with the discharge opening 36 in disc 13 and discharge their contents through said opening. Compartment 34 will be left in registry with opening 36, as indicated in FIG. 1, however, wall 35 on said compartment 34 will prevent discharge of the contents of compartment 34 through opening 36. The remaining compartments 32, 33 do not register with opening 36.

It will be apparent that this operation may be repeated for other angular settings of member 12 relative to its initial rest position, followed by reverse movement of the member to discharge a number of compartments corresponding to the selected angular position of member 12.

The top edges of partition walls 26, 26a, as well as hub portion 25 may be slightly depressed to allow a flush fit of disc 13 thereon. The lower peripheral edge of member 12 engages ring 21 on member 11 to provide a smooth fit therebetween.

When member 11 is made of a plastic having some elasticity, such as polyethylene or the like, bead 16 on flange 15 thereof will readily slip over shoulder 17 on container C. However, if a rigid plastic is used in making member 11, wall portion 14A is provided with an outer flange 15A of continuous circumferential extent and an inner flange 42 which is transversely slotted at close intervals, as at 43 to render flange 42 somewhat flexible and allow bead 16A thereon to slip over and engage shoulder 17 on container C.

As various changes might be made in the embodiment of the invention herein shown without departing from the spirit thereof, it is understood that all matter herein disclosed shall be deemed illustrative and not limiting except as set forth in the appended claims.

Having thus disclosed my invention, I claim as new and desire to protect by Letters Patent:

1. A device for measuring and dispensing the contents of a container comprising a base member having a wall and means extending from said wall for attachment to said container at the mouth thereof, said wall being formed with a sector shaped opening leaving a sector shaped wall portion, a disc in opposed spaced relation to said wall, means connecting said disc in fixed relation to said wall, a substantially tubular member having a substantially cylindrical side wall extending between said wall and said disc and rotatable relative to said wall and disc, said tubular member having an axial portion rotatably mounted on said connecting means, said tubular member having a plurality of radial partitions forming a plurality of successive, adjacent sector shaped compartments open at the opposite ends thereof, means for closing one sector shaped compartment at one end thereof, said closed compartment lying between and immediately adjacent open compartments, interengageable means on said wall and said tubular member for locating said tubular member in a rest position relative to said wall wherein said closed compartment and the compartment on either side thereof are closed at the inner ends thereof by said sector shaped wall portion, while leaving the remaining compartments in communicating relation with the interior of said container through the sector shaped opening in said wall, said disc having a dispensing opening coextensive with the opening of a single compartment, said dispensing opening being located in alignment with a central portion of said sector shaped wall portion, said tubular member being movable from said rest position to predetermined angular filling positions, said tubular member being then movable back to its rest position while said container is in an inverted position whereby to successively discharge through the dispensing opening of said disc the contents of the compartments in advance of said one compartment as they successively register with said dispensing opening.

2. A dispensing device for attachment to the mouth of a container comprising a circular member having a base wall including a sector shaped opening and a sector shaped wall portion, a disc in spaced parallel relation to said base wall, said disc having a sector shaped discharge opening, means for holding said disc in fixed relation to said base wall, a tubular member between said disc and said base wall and in abutting relation thereto, said tubular member including a plurality of radially extending portions providing a plurality of immediately adjacent sector shaped compartments open at the opposite ends thereof, said tubular member further including sector shaped means separating a pair of said compartments, the angular extent of said sector shaped means being substantially equal to the angular extent of the discharge opening in said disc, stop means for locating said tubular member in a position relative to said disc and base wall whereby in the sector shaped means of said tubular member is in opposed relation to the sector shaped wall portion of said base wall, said sector shaped wall portion of the base wall having an angular extent sufficient to close the inner ends of said separated pair of compartments of said tubular member, the discharge opening in said disc being closed by the sector shaped means of said tubular member when said tubular member is in said position thereof, said tubular member being rotatable between said disc and base wall to other selected positions thereof and back to said one position to successively register a selected number of immediately adjacent compartments of said tubular member with the discharge opening in said disc, to dispense the contents of only the selected number of compartments.

3. A device as in claim 2 wherein said disc holding means comprises a post and said tubular member includes an axial hub portion rotatably mounted on said post.

4. A measuring and dispensing device comprising a base member attachable to the mouth of a container for dispensing measured quantities of the contents thereof, said base member having a wall formed on a portion thereof with an opening, a tubular member rotatably mounted on said base member, a disc closing the outer open end of said tubular member, means for fixing said disc relative to said base member, said disc having a discharge opening, said tubular member having a plurality of similar immediately adjacent radially extending compartments open at the opposite ends thereof, means on said tubular member separating a pair of said compartments, said separating means having an extent substantially equal to that of one of said compartments, said base member wall having another portion thereof of an extent to close the inner ends of a predetermined number of said immediately adjacent compartments, the discharge opening in said disc being equal in size to the open end of one of said compartments, said tubular member in a rest position thereof having the separating means thereof operative to close the discharge opening in said disc, said tubular member being movable to selected angular positions and back to said rest position whereby to register only those immediately adjacent compartments of said tubular member in advance of the separating means thereof with the discharge opening of said disc, the total number of compartments in said tubular member less said predetermined number of immediately adjacent compartments being in registration at their inner ends with the opening in said base member wall in any position of said tubular member relative to said base member.

5. A device as in claim 4 wherein said base member includes stop means and said tubular member includes abutment means engageable with said stop means to determine the rest position of said tubular member relative to said base member.

6. A device as in claim 4 wherein said base member wall closes three successive compartments of said tubular member, and the discharge opening of said disc being sector shaped and in alignment with an intermediate radial portion of said base member wall.

References Cited in the file of this patent

UNITED STATES PATENTS

| | | |
|---|---|---|
| 2,032,763 | Mostkoff | Mar. 3, 1936 |
| 2,471,495 | Pfau | May 31, 1949 |
| 2,584,781 | Beatty | Feb. 5, 1952 |